United States Patent [19]

Andrei-Alexandru et al.

[11] Patent Number: 4,489,599
[45] Date of Patent: Dec. 25, 1984

[54] DEVICE FOR MONITORING THE INFLATION PRESSURE IN A TIRE OF A VEHICLE WHEEL

[75] Inventors: Marcel Andrei-Alexandru; Hans Prohaska, both of Bietigheim-Bissingen, Fed. Rep. of Germany

[73] Assignee: ITT Industries, Inc., New York, N.Y.

[21] Appl. No.: 474,049

[22] Filed: Mar. 10, 1983

[30] Foreign Application Priority Data

Apr. 10, 1982 [DE] Fed. Rep. of Germany ....... 3213552

[51] Int. Cl.$^3$ .............................................. B60C 23/02
[52] U.S. Cl. .................................................. 73/146.5
[58] Field of Search ............................ 73/146.5, 146.8; 340/58; 277/95

[56] References Cited

U.S. PATENT DOCUMENTS 2,063,452  12/1936  McDonnell .......................... 340/58
2,145,363  1/1939   Miller ................................... 340/58

Primary Examiner—Donald O. Woodiel
Attorney, Agent, or Firm—James B. Raden; William J. Michals

[57] ABSTRACT

In a tire pressure monitoring device for motor vehicles the electric signal of the pressure sensor is galvanically transmitted directly via the outer ring, the rolling bodies and the inner ring of a rolling bearing carrying the rotating wheel. The signal transmission is effected via leads and contact connections automatically opened when the wheel is demounted and automatically closed when the wheel is mounted. The inflation pressure is also conducted via a rolling bearing developed as a sealed unit in order to remote-adjust the tire pressure en route.

3 Claims, 3 Drawing Figures

DEVICE FOR MONITORING THE INFLATION PRESSURE IN A TIRE OF A VEHICLE WHEEL

BACKGROUND OF THE INVENTION

This invention starts from a device for monitoring the inflation pressure in a tire of a vehicle wheel according to the features of the preamble of claim 1.

In devices of this kind which supervise the inflation pressure of vehicle tires the signal transmission from the rotatable part to the stationary part is difficult. In practice a galvanic signal transmission via sliding contacts proved to be very susceptible to trouble. This is why wireless signal transmission systems have been developed. However the amount of circuitry for systems of this kind is considerable and, moreover, as the practice showed, the transmission of the signals does not function satisfactorily in each case.

This invention is therefore based on the problem of developing a device of this kind for monitoring the inflation pressure so/that the signal transmission can be effected properly with an amount of production technique as small as possible. Morover, the signal transmission path is to be laid out so as to allow a mounting or demounting of the wheel without additional working steps.

SUMMARY OF THE INVENTION

According to the present invention this problem is solved by the features of the present invention described below.

The invention is thereby based on the consideration of directly using the rolling bearing carrying the wheel for signal transmission by insulating the outer and inner ring of this rolling bearing from the fitting surfaces. Because the parts of the rolling bearing are usually made from metal a signal can therefore directly be transmitted from the outer ring via the rolling bodies to the inner ring and thus a galvanic signal tranmission path is obtained between a rotating and a stationary part. Thus no additional parts complicating a mounting of the wheel are used.

According to an advantageous development of the invention, in order to achieve a simple mounting, it has been suggested to effect the signal transmission between one ring of the rolling bearing and the pressure sensor via at least one contact element which may easily be disconnected. In vehicles in which the wheel is detachably secured on a brake drum rotatably supported on a kingpin via the rolling bearing, the signal transmission between wheel and brake drum on the hand and between brake drum and one ring of the rolling bearing on the other hand is effected via a contact connection each which may easily be disconnected. On the one hand this allows the vehicle wheel to be easily detached from the brake drum and, on the other hand, a demounting of the brake drum from the kingpin without having to undo screwed or soldered connections for this purpose.

Devices of a kind have become known in which, in addition to monitoring the inflation pressure in a tire, it is also possible to remote-adjust the tire presse en route. According to an advantageous development of the invention it is suggested for devices of this kind to develop particular components so as to may them suitable both for transmission of electric signals and for adjusting the inflation pressure in order to achieve a small amount of production costs. Here an embodiment is preferred in particular, in which the compressed air is directly conducted via a rolling bearing, which is formed as a sealed constructional unit having an inlet and an outlet fitting. Independent protection is claimed for this design, because this measure can also be advantageously used if, for example, the signal of the pressure sensor were radio-conducted to an evaluating stage.

BRIEF DESCRIPTION OF THE DRAWING

The invention and further advantageous embodiments are described below by way of the accompanying drawings, in which.

DETAILED DESCRIPTION

Figure 1:
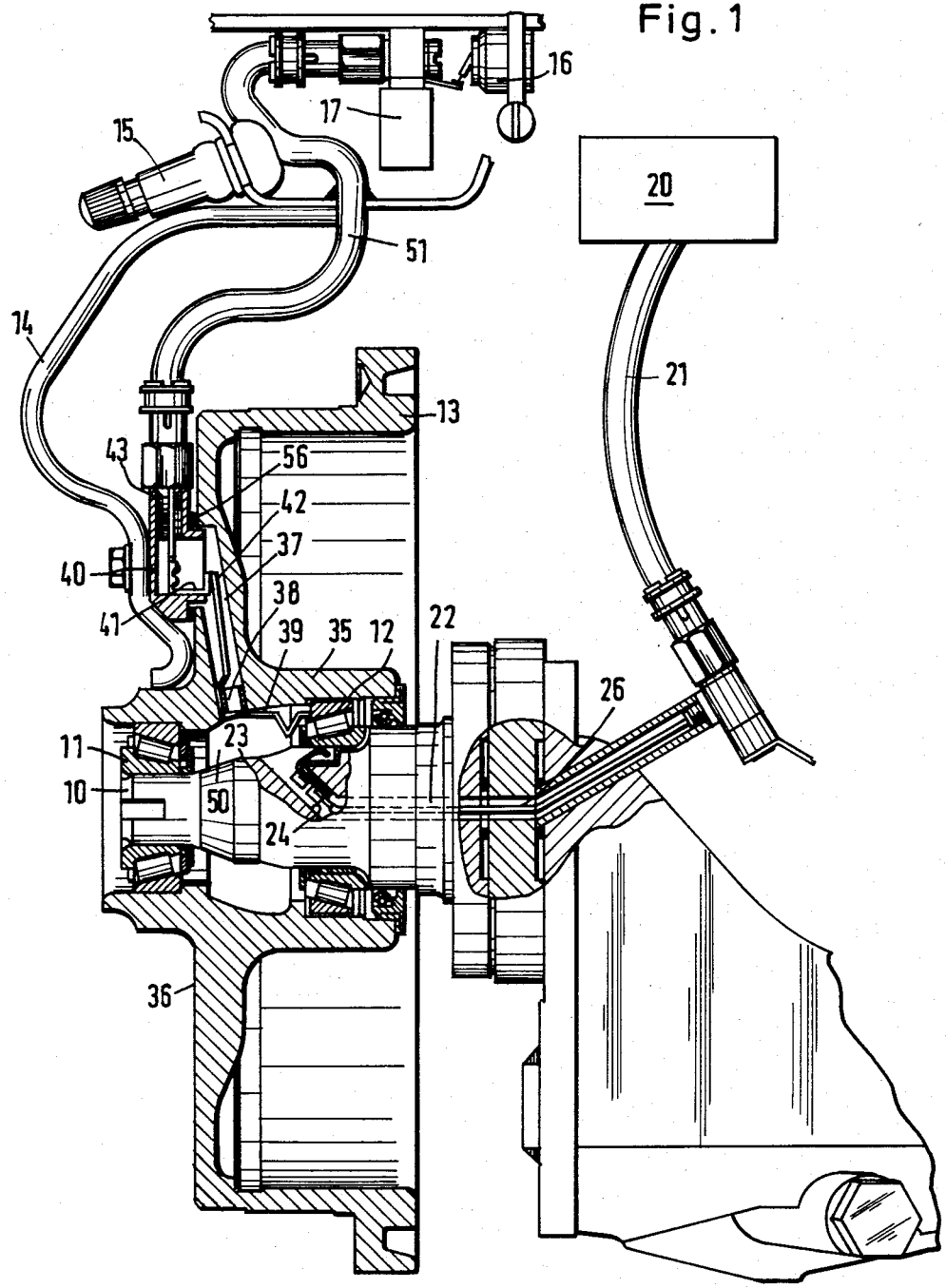
FIG. 1 is a partial section through a vehicle wheel rotatably mounted on a stationary kingpin.

FIG. 1 shows a kingpin 10 on which, via two rolling bearings 11 and 12, a brake drum 13 is rotatably supported onto which the wheel rim of the wheel 14 is screwed in known manner. The tire not shown in detail can be filled with air via the inlet valve 15. In the tire there is, moreover, the pressure sensor 16 as a constructional unit with a non-return valve 17, through which the tire pressure may be remote-adjusted en route. The signal of the pressure sensor 16 is conducted to a signal evaluating stage, as a whole designated 20. If the pressure falls below a given minimum value this is optically or acoustically indicated by this evaluating stage 20. If the system—as in the present case—is coupled with a device for remote-adjusting the tire pressure, this signal evaluating stage releases a switching signal for a pump as soon as the tire pressure falls below a given minimum value, so that this pump supplies air into the tire. The design of this signal evaluating stage is not essential for the present invention, so that further statements in this respect are not necessary.

From the signal evaluating stage 20, that is to say from the pump controlled by this signal evaluating state, is conducted a pressure pipe 21 of an axial bore 22 in the kingpin 10, which bore changes into a duct 24 with a recess 25, which duct opens slantingly into the fitting surface 23 of the kingpin. A cable 26 is conducted within this pressure pipe portion. This cable serves for transmitting the signal from the pressure sensor to the signal evaluating stage.

Figure 2:
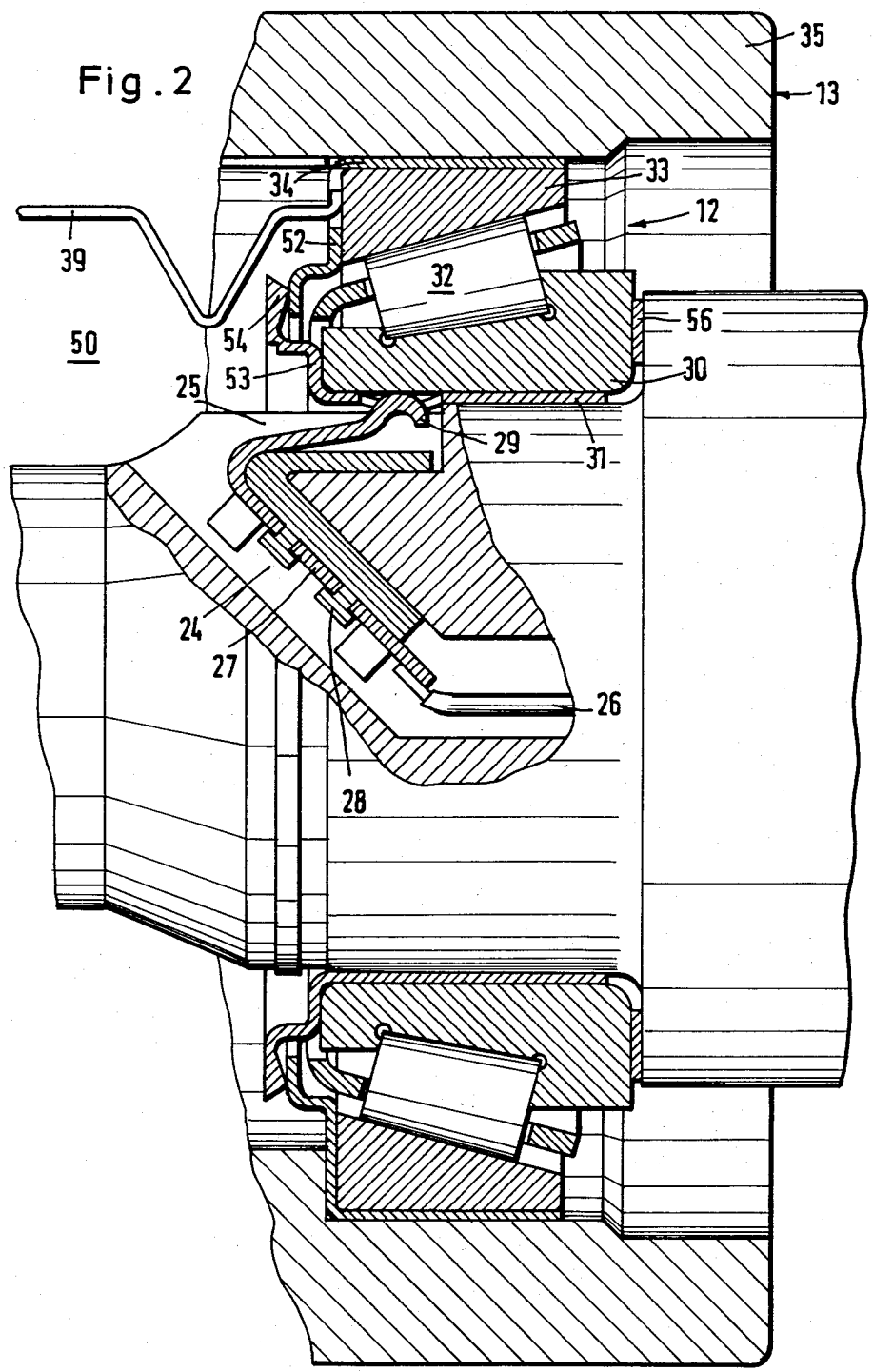
FIG. 2 is an enlarged view of a signal-transmitting device comprising a rolling bearing and FIG. 3 is a section through a rolling bearing for inflation pressure transmission.

From FIG. 2 can be seen that the cable 26 is connected with a contact spring in an electrically conductive manner, which contact spring is fixed to an insulating piece 28 secured in the duct 24 and in the recess 25 respectively, which recess lies in the area of the rolling bearing 12. A resilient leg 29 rests directly against the surface area of the inner ring 30 of this rolling bearing 12. This inner ring is electrically insulated from its fitting surface on the kingpin 10 by a layer 31 from non-conductive material. An outer ring 33 is rotatably supported on the inner ring 30 via rolling bodies 32. The outer ring 33 is electrically insulated from its fitting surface on the bearing flange 35 of the brake drum 13 by a non-conductive layer 34.

From the bearing flange 35 of the brake drum 13 extends an aperture 37 slantingly opening into the front face of bearing surface 35 in which aperture is fixed a two-legged contact spring 38 in an electrically insulated way. One leg 39 of this contact spring rests against the front face of the outer ring 33 of the rolling bearing 12 in an electrically conductive manner. A connection piece 40 from plastics material is fixed on the rim of the vehicle wheel 14. In this connection piece is secured an electric contact 41, upon which resiliently rests the other leg 42 of the contact spring 38. A lead 43 is conducted from the contact 41 to the pressure sensor 16 in the vehicle tire.

Therefore, with regard to signal transmission between pressure sensor and signal evaluating stage the following has to be stated:

For a signal transmission is used a constructional unit which is available in a motor vehicle in any case, namely the rolling bearing 12. In this connection—and this is important—the rolling bearing carrying the wheel is concerned. Thus no additional bearing, slip ring or similar components have to be used. The rolling bearing 12 is a constructional unit available on the market. It is only necessary to electrically insulate that parts of the rolling bearing which could rest against adjacent metallic parts. Insofar, as in deviation from the embodiment shown, a development for adjusting the pressure en route is not required, this insulation can easily be realized in that on those parts of the inner or outer ring which come to rest against adjacent metallic areas a ceramic or enamel layer is surfaced. Thus additional parts are not absolutely necessary. In this connection it has, however, to be pointed out that a ceramic layer, due to its high insulating resistance, has to be thin, so that, under certain circumstances, the supporting surfaces on the kingpin and on the bearing flange of the brake drum respectively will not have to be modified.

In the embodiment shown the signal transmission between the stationary part, namely the kingpin, and the rotatable vehicle tire is realizend via several contact connections which may be easily disconnected. One of these contact connections is formed by one leg 42 of the contact spring 38 and the countercontact 41 between the brake drum 13 and the wheel 14. This contact connection is laid out so as to provide an automatic interruption of this contact connection, when the wheel 14 is demounted, without requiring additional working steps for this purpose. A second contact connection is realized between the leg 39 of the contact spring 38 and the outer ring 33 of the rolling bearing 12. This contact connection is also laid out in a way allowing an interruption of the electrically conductive connection without additional means in case the brake drum is demounted from the kingpin 10. When the brake drum is mounted this contact connection is automatically reestablished.

A further contact connection, which may easily be interrupted, is realized by the contact spring 27 which rests against the surface area of the outer ring 33 of the rolling bearing 12. This allows a mounting or demounting of the rolling bearing 12 in a simple way.

Until now mainly the electric signal transmission between the pressure sensor and the signal evaluating stage has been described which distinguishes by having contact connections, which may be easily interrupted in the decisive points, so that the members of the vehicle wheel can be mounted and demounted without difficulty. The piece parts for transmitting the signal can also be easily mounted. In this connection it is pointed out that it is intended that the duct 24 opens slantingly into the bore 22, so that the cable 26 can be easily inserted. Thus a signal transmitting device has been created which functions reliably and can be easily mounted and demounted.

The pressure pipe between the tire and a pump not shown in detail will be described below. The pressure pipe 21 opens into the axial bore 22 in the kingpin 10. The duct following this bore opens into a ring space 50 between the bearing flange 35 of the brake drum and the kingpin 10, which in the axial direction is closed by the two rolling bearings 11 and 12. It will be described below in which way this ring space is sealed. From this ring space 50 the compressed air streams over the aperture 37 into the fitting 40 and from there to the non-return valve 17 in the tire via a pressure pipe 51.

The pressure space 50 is sealed by seal rings 52 and 53 respectively, of which seal rings rests one against the front face of the outer ring 33 of the rolling bearing 12 and the other against the front face of the inner ring 30 of the rolling bearing 12. A sealing lip 54 on the seal ring 53 is resiliently supported on the other seal ring 52. The detailed design of the rolling bearing 12 can be seen from FIG. 2. The ring space 50 is accordingly sealed at the other rolling bearing 11.

In the embodiment shown these seal rings are provided with a projecting flange each, which is clamped between the surface area of the assinged ring of the rolling bearing and the corresponding fitting surface. Because these sealing bodies are made from plastics material this circumferential flange serves simultaneously as an insulating layer 31 and 34 respectively for the rolling bearing. In this connection it is pointed out that in FIG. 2 a further insulating ring 55 is shown which rests against the other front face of the inner ring 30 and which electrically insulates this area from the adjacent metallic area on the kinpin.

A further seal ring 56 lies between the fitting 40 and the front face of the brake drum 13. A design of this kind ensures that in case of mounting or demounting of wheel and brake drum no pressure-transmitting connections have to be closed or separated by additional working steps.

Figure 3:
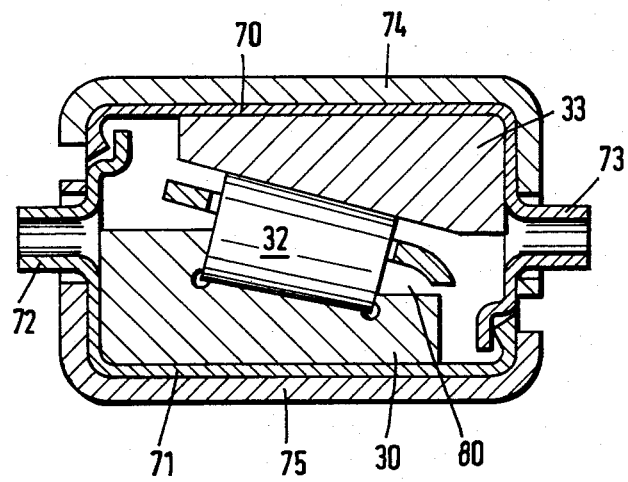

FIG. 3 shows an embodiment of a rolling bearing which is directly formed for inflation pressure transmission. On the outer ring 33 and the inner ring 30 are secured two sealing bodies each, designated 70 and 71 respectively, which have a fitting 72 or 73 each. These sealing bodies are made from plastics material and therefore can at the same time be used as an electric insulating layer. Neoprene in particular proved to be a suitable material for these sealing bodies. Over each of the sealing bodies 70 and 71 is slipped a sheet metal jacket 74 and 75 respectively which fixes the sealing bodies on the rings of the rolling bearing. Thus this is a pre-mounted constructional unit which can be fitted in the vehicle instead of the rolling bearings used until now.

From FIG. 3 can be seen that the fittings 72 and 73, of which one forms a pressure input and the other a pressure output, are secured in a way that the compressed air streams over the ring space 80 for the rolling bodies 32.

In the embodiment shown in FIG. 3 a signal transmission via inner ring, outer ring and rolling body is not provided. But it is clear to those skilled in the art that the design according to FIG. 3 can also be developed in the sense of the designs according to FIG. 2 by providing recesses in the sheet metal jacket and on the sealing body respectively, through which the contact springs can then directly fly back on the inner and outer ring respectively.

It will finally be pointed out that the basic idea of the invention of course can also be realized, if the vehicle wheel is a driven wheel, because also in this case a rolling bearing is used between the driving shaft of the wheel and a bearing flange on the vehicle, which rolling bearing can both be used for transmitting electric signals and for conducting compressed air.

What is claimed is:

1. A device for monitoring the inflation pressure in a tire of a vehicle wheel, which is rotatably supported on a stationary part via at least one rolling bearing consisting of an outer ring, an inner ring and several rolling bodies from electrically conductive material, comprising a pressure sensor in the tire, the pressure-dependent electric signal of which pressure sensor is transmitted to a stationary signal-evaluating stage, wherein the signal transmission is effected via a rolling bearing (12) carrying the wheel (14), one ring (33) of said rolling bearing being connected in an electrically conductive manner to the pressure sensor (16) and its other ring (30) to the signal-evaluating stage (20), whereby the inner and outer ring (33, 30) are insulated from their fitting surfaces on the stationary and rotatable part respectively;

wherein the signal transmission between one ring (33) of the rolling bearing (12) and the pressure sensor (16) is effected via at least one contact connection which may be easily disconnected;

wherein the vehicle wheel is detachably mounted on a brake drum which is rotatably supported on a kingpin via the rolling bearing, both the signal transmission between wheel (14) and brake drum (13) and between brake drum (13) and one ring (33) of the rolling bearing (12) carrying the brake drum (14) is effected via a contact connection which may be easily disconnected; and wherein a two-legged contact spring is insulatedly fixed on the brake drum (13), the one leg (39) of which spring rests resiliently against a ring (33) of the rollihng bearing (12) and the other leg (42) against a contact (41) insulatedly fixed on the wheel (14).

2. A device according to claim 1, wherein one leg (39) of the contact spring (38) supports on a front face of the outer ring (33) of the rolling bearing (12).

3. A device for monitoring the inflation pressure in a tire of a vehicle wheel, which is rotatably supported on a stationary part via at least one rolling bearing consisting of an outer ring, an inner ring and several rolling bodies from electrically conductive material, comprising a pressure sensor in the tire, the pressure-dependent electric signal of which pressure sensor is transmitted to a stationary signal-evaluating stage, wherein the signal transmission is effected via a rolling bearing (12) carrying the wheel (14), one ring (33) of said rolling bearing being connected in an electrically conductive manner to the pressure sensor (16) and its other ring (30) to the signal-evaluating stage (20), whereby the inner and outer ring (33, 30) are insulated from their fitting surfaces on the stationary and rotatable part respectively;

wherein the signal transmission between a ring (30) of the rolling bearing (12) and the signal-evaluating stage (20) is effected via at least one contact element (27) to be easily disconnected, which rests resiliently against the surface area of a ring (30) of the rolling bearing (12); and, wherein the vehicle wheel is detachably fastened on a brake drum, which is rotatably supported on a kingpin via a rolling bearing, characterized in that the kingpin (10) has an axial bore (22) changing into a duct opening into the bearing lining, which duct (24) has a recess (25) in the area of the rolling bearing and that in this duct (24) a contact spring (27) is insulatedly fixed, which supports resiliently on the surface area of the inner ring (30) of the rolling bearing (12).

* * * * *